United States Patent [19]

Lagerholm et al.

[11] 4,343,576

[45] Aug. 10, 1982

[54] BORING DEVICE

[75] Inventors: Kurt Lagerholm, Hirschberg-Grossachsen, Fed. Rep. of Germany; Kurt H. A. E. Faber, Sandviken, Sweden

[73] Assignee: Sandvik Aktiebolag, Sandviken, Sweden

[21] Appl. No.: 131,372

[22] Filed: Mar. 18, 1980

[30] Foreign Application Priority Data

Mar. 23, 1979 [SE] Sweden .............................. 7906920

[51] Int. Cl.³ ............................................ B73B 9/034
[52] U.S. Cl. .................................... 408/155; 408/157; 408/158; 408/173; 408/178
[58] Field of Search ............... 408/154, 155, 148, 149, 408/159, 158, 173, 178, 180, 172, 157, 168, 156

[56] References Cited

U.S. PATENT DOCUMENTS

| | | | |
|---|---|---|---|
| 2,990,730 | 7/1961 | Pougland | 408/148 |
| 2,998,737 | 9/1961 | Yocus et al. | 408/180 X |
| 3,200,673 | 8/1965 | Pfeifer | 408/154 |
| 3,203,453 | 8/1965 | Bergstrom | 408/180 X |
| 3,274,861 | 9/1966 | Czubak | 408/180 |
| 3,391,585 | 7/1968 | Griswold et al. | 408/158 X |
| 3,918,826 | 11/1975 | Friedline | 408/168 X |
| 4,140,432 | 2/1979 | Heule | 408/157 X |
| 4,195,957 | 4/1980 | Wittkopp et al. | 408/148 |

FOREIGN PATENT DOCUMENTS 607670  5/1978  U.S.S.R. .............................. 408/154

*Primary Examiner*—William R. Briggs
*Attorney, Agent, or Firm*—Burns, Doane, Swecker & Mathis

[57] ABSTRACT

The present invention relates to a boring device for boring internal surfaces of hollow workpieces of the kind which comprises radially adjustable insert-provided holders, there being provided pressure means, such as steering pins so as to effect radial adjustment of the insert holder from an outer active working position to an inactive position. The radial adjustment occurs by having each insert holder via said steering pins supported against a bushing of non-circular cross section actuatable by a shaft member centered within the bushing, said bushing upon its rotation effecting said radial adjustment.

14 Claims, 12 Drawing Figures

BORING DEVICE

The present invention relates to a boring device for boring the internal surfaces of workpieces of the kind which comprises radially displaceable insert-provided holding members. The invention is specifically concerned with the type of boring head used for skiving, hereinafter called skiving tool for instance for tubes that should have a bearing surface mating with hydraulic cylinders.

During such working the tool is axially advanced through the workpiece. The skiving tool can be provided with one or several guide pads adapted to support and guide the tool along the bore in the workpiece. Usually there is provided a combined tool for boring and roller burnishing for finishing the internal surface of the bore to be produced. This burnishing operation is effected when the skiving tool is axially returned to its initial position before starting each processing cycle. It is to be understood that each insert on the skiving head has to be withdrawn before such burnishing in order not to cause damages on the internal surface of said bore previously produced.

The known boring head arrangements all have considerable disadvantages, primarily due to the dismounting of the inserts from the boring head before burnishing is to occur. Simultaneously it has not to a desirable extent been found possible to provide rapid and simple radial adjustment of the inserts on the boring head. It is also desirable being able to provide adjustment of releasable fastened inserts of a boring head only by mechanical means.

It is an object of the present invention to provide a boring tool which avoids the above-mentioned disadvantages of such tools known in the art. With these and other objects in view the insert package of the tool is able of being radially reciprocated in a new manner, which enables improved possibilities of maintaining one and same diameter throughout the entire length of the bore to be produced.

The object of the invention is obtained by providing a boring head provided with radially adjustable insert holders and one or several guide pads axially extending along the periphery of said boring head, the improvement being the arrangement of each insert holder so as to abut pressing means arranged in contact with a bushing having a bore of non-circular shape within which an axially movable shaft is received with radial clearance, there additionally being means provided so as to cause radial adjustment of said insert holder upon axial movement of said shaft, said adjustment occurring between a working position and a radially inner inactive position of said insert holder. The bushing can advantageously be oval in shape whilst jointly rotatable with said shaft so as to provide radial adjustment between said working and inactive positions.

The invention will now be described more in detail in connection with the accompanying drawings, illustrating a preferred embodiment of the invention.

Figure 6:
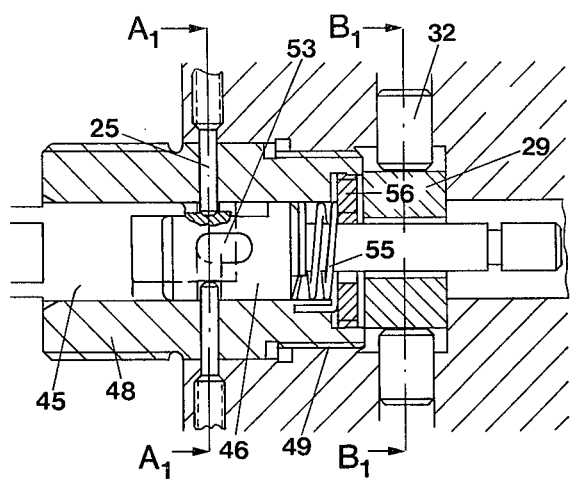
Figure 7:
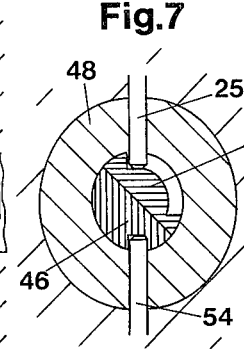
Figure 8:
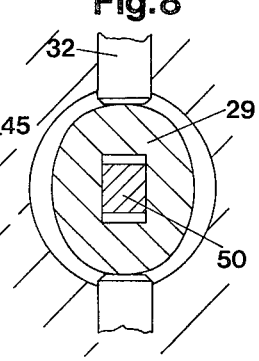
Figure 9:
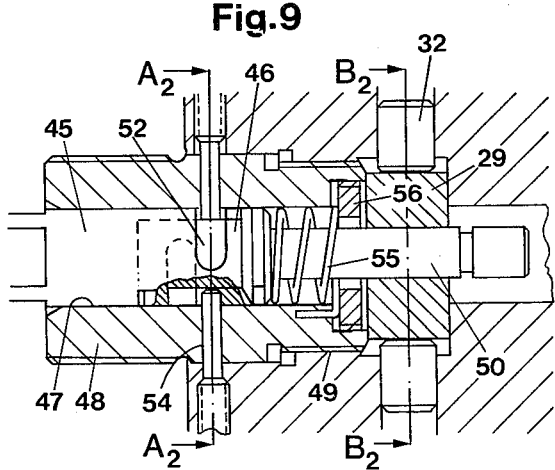
Figure 10:
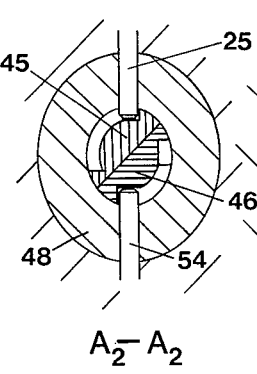
Figure 11:
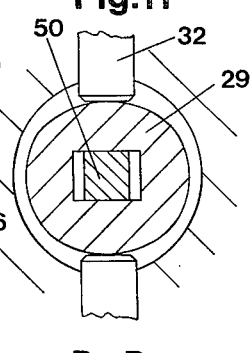
Figure 12:
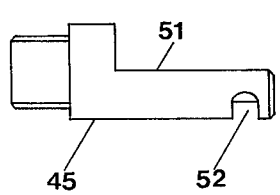
Figure 12:
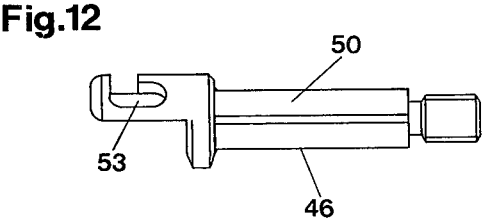

FIG. 6 is an axial sectional view of a tool according to another embodiment of the invention with the tool shown in working position, FIG. 7 is a section along the line $A_1$—$A_1$ in FIG. 6, FIG. 8 is a section along the line $B_1$—$B_1$ in FIG. 6, FIG. 9 is an axial sectional view of the tool of FIG. 6 shown in non-working position, FIG. 10 is a section along the line $A_2$—$A_2$ in FIG. 9, FIG. 11 is a section along the line $B_2$—$B_2$ in FIG. 9 and FIG. 12 is a side view showing the adjustable shaft of the embodiment in FIGS. 6–11.

Figure 1:
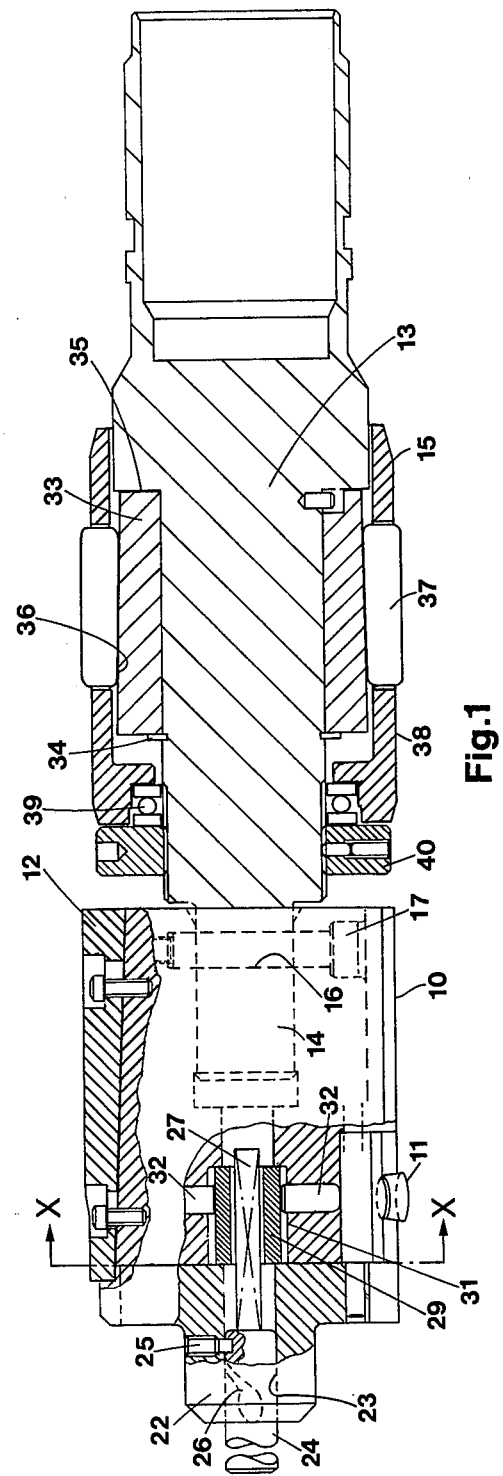
FIG. 1 is an axial sectional view of the tool according to the invention.
Figure 2:
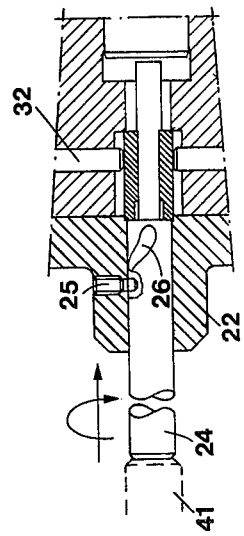
FIG. 2 is an enlarged view of a detail of FIG. 1.
Figure 3:
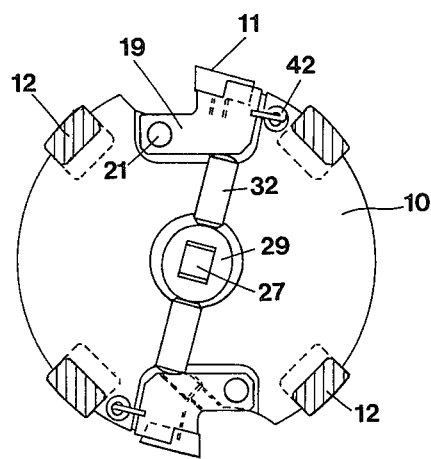
FIG. 3 is a cross-section along the line X—X with the tool shown in working position.
Figure 4:
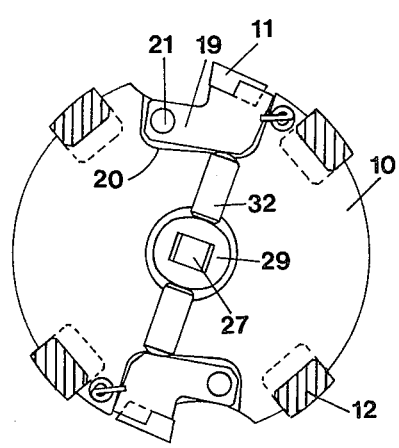
FIG. 4 is a cross-section along the line X—X with the tool shown in non-working position.

Referring now to the drawings FIGS. 1–3 show a tool comprising a boring head 10 for skiving operations, the mantle surface of which being provided with two diametrally opposed releasably fastened inserts 11 and longitudinally extending guide pads 12. These pads might be made of wood or bakelite adapted to slide against the surface of the bore to be produced. The boring head 10 is supported on an arbor 13, the fore portion 14 of which supports said head 10, and supports a roller burnishing tool 15 for finishing the internal surface of the bore to be produced. This combined tool for boring and burnishing the internal surfaces of workpieces is connected to a feed tube (not shown) by means of which said tool is able to be axially advanced through a hollow workpiece. The boring head 10 is connected to the end 14 of said arbor 13 by means of a bolt 17 received in a bore 16 that extends transversely through the arbor, said bolt 17 being arranged in the boring head such that a rotary force transmitting coupling is achieved therebetween.

As mentioned above the boring head 10 is adapted for internal skiving operations and for that purpose said boring head 10 is equipped with two diametrally opposed circularly shaped cutting inserts 11 which are tangentially oriented and consisting of cemented carbide or any other wear resistant material. It is to be understood that also other than circular shapes of inserts are usable. The inserts 11 are releasably fastened and hence they can be indexed in order to expose a new edge portion for cutting operations. For that purpose each insert is centrally apertured so as to receive therethrough a centre screw 18 threadably engaged with a tool holder 19, which is releasably clamped into a peripheral recess 20 of said boring head 10. More specifically, said tool holder 19 is pivotally supported on an axially oriented axial portion 21 in said boring head 10.

The end portion of the boring head 10 located opposite from said rolled burnishing tool 15 is provided with an axially extending shank portion 22 which is provided with a central bore 23 therethrough in which a shaft 24 extending from said shank portion 22 is supported. The shank portion 22 is provided with a radial setting screw 25 the innermost portion of which is adapted to engage in a spirally extending guiding slot 26 on the mantle surface of said shaft 24.

The end portion 27 of the shaft 24 facing the roller burnishing tool 15 is square in cross section and supported in a rectangularly shaped recess 28 in a bushing 29 whilst leaving radial clearance 30 therein. The bushing 29 is oval in shape and is axially non-displaceable in a corresponding central bore 31 in the boring head 10. The mantle surface of said bushing is arranged in abutment with two diametrally opposite steering pins 32. The opposite surfaces of said pins 32 are suitably smoothly rounded for surface abutment with their respective insert holders 19 which, as already mentioned, are pivotally mounted on support shafts 21 axially extending on said boring head 10. Due to this arrangement with radial clearance 30 between the shaft end 27 and the recess 28 a radial linear movement for the insert holders 19 is achieved which facilitates the achievement of uniform diameter of the hole to be produced. It is to be understood, however, that also other alternative shapes of said shaft end 27 and said recess 28 can apply if a radial movement of said insert holders 19 is provided for.

The roller burnishing tool 15 consists of a support ring 33, which by means of another ring 34 is axially non-displaceably arranged in axial abutment with a radial shoulder abutment 35 on said shaft 13. The support ring 33 has a frustoconical surface 36 with reducing diameter in a direction opposite from said boring head 10. This surface abuts against corresponding conically shaped rollers 37 arranged with axial spacing in an annular cage 38 which is rotatably mounted in relation to said shaft 13 by means of ball bearings 39. A sleeve 40 threadably engaged with the shaft 13 is arranged, after turning thereof, to provide for adjustment of various diameter values for the rollers 37 of said roller burnishing tool.

Skiving occurs whilst axially advancing the skiving tool 10 through the bore of the relevant workpiece. After the finalization of said cycle the inserts 11 should be removable into an inner inactive position. According to the invention said removal of the inserts is possible by having the insert holders 19 supported against the rotatable bushing 29 of non-circular shape which is able to provide radial adjustment to the holders 19 and the inserts 11 via cylindrical steering pins 32. The mechanical action that must be induced to the shaft 24 located inside said bushing 29, which is jointly rotatable with the shaft 24, is accomplished by having said shaft 24 advanced against a stop means 41. Upon continued advancement of the tool said shaft 24 is urged to rotate because of the spiral path in the slot 26 on the mantle surface of the shaft 24, which the setting screw 25 must follow. Since the inner section 27 of said shaft received in said bushing 29 has a square cross-section it is needful to have the shaft turned around just 90° to have the inserts 11 entirely removed from their working positions to their inactive positions. The tool is then subjected to a return stroke whilst finish-machining the bore by the roller burnishing tool member 15. It is to be understood that any other indication means, alternative to said stop means might be used to cause a rotary movement to said shaft 24 and removal of said inserts from a working position after finalization of each working cycle. It would be possible also to use any other means than those shown for the purpose of causing radial adjustment of said insert holders 19, for instance some axially movable, non-rotatable means located between said shaft 24 and said holders 19.

In order to ensure that each insert holder 19 is always urged against the ends of the steering pins 32 located opposite to the tool axis, even after adjustment thereof to the inactive position, there is provided a spring means 42 received in the boring head 10, one end portion of said spring being adapted to engage in a recess 43 in said holder 19.

Figure 5:
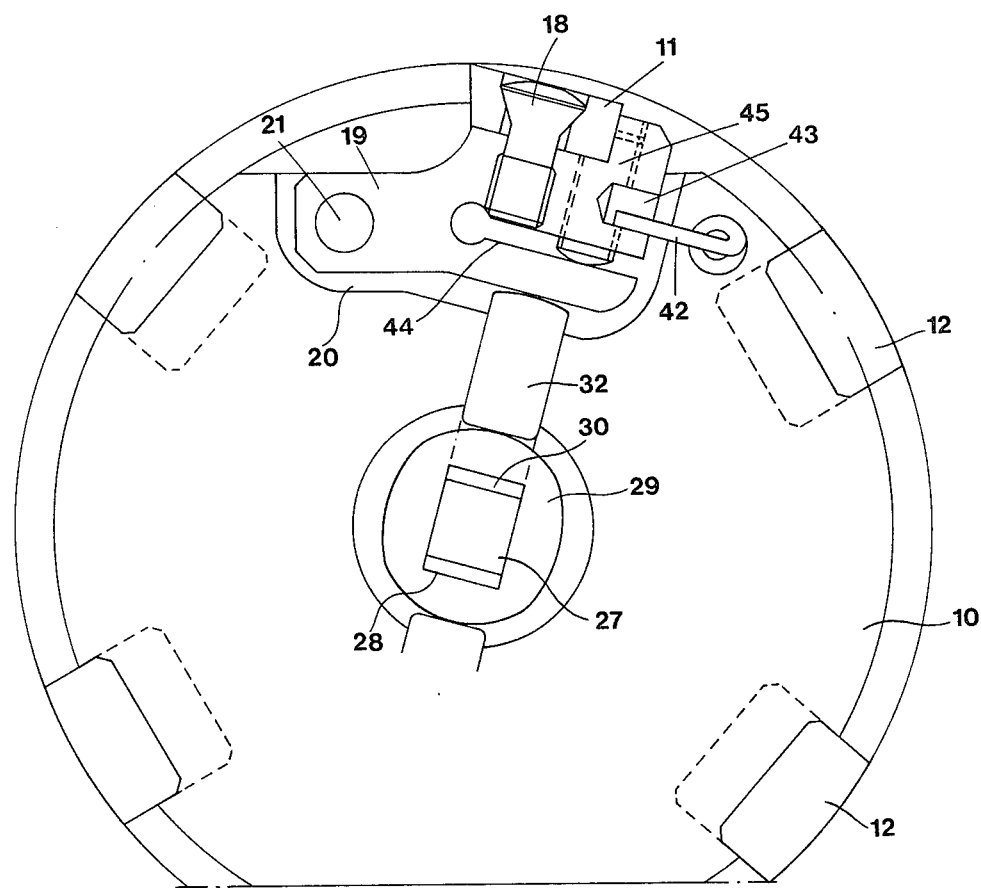
FIG. 5 is a cross-section of an alternative embodiment of the invention.

In order to be capable of having each insert holder 19 radially adjusted to a position inbetween said outer working position and said inactive position the holder 19 is provided with a tangentially extending slot 44 as shown in FIG. 5 in which a radial set screw 45 provided in said holder 19 engages. When in-screwing said screw 45 the radially outer insert-holding portion of said holder 19 is pressed radially outwards. Alternatively said set screw 45 could be arranged in direct surface contact relation with the steering pin 32.

In FIGS. 6–13 there is shown an alternative embodiment of adjustment means that is able to cause radial adjustment of said insert holders 19 from working to inactive positions. There is provided a shaft corresponding with the shaft 24 in FIGS. 1–2 but now provided in a two-piece structure, an outer member 45 and an inner member 46. The outer member 45 is supported within the bore 47 of a tubular member 48, said tubular member 48 being threaded at 49 and engaged with corresponding threads of the tool body. The inner member 46 is also partially supported within said tubular member 48 whilst having an axial extension 50 of square cross-section centered in the bushing 29, the mantle surface of which is in surface abutment with radial steering pins 32 in the manner shown in connection with FIG. 1.

The outer member 45 is provided with an axial recess 51, leaving a half-spherical mantle surface provided with a transversal I-slot 52 with which the set screw 25 is intended to engage similar to FIG. 1. The inner member 46 is likewise half-spherically shaped and adapted to be received in the correspondingly shaped recess 51 whilst provided with an L-slot 53 in its mantle surface in which a steering pin 54 is engageable. A coiled spring 55 and a spring washer 56 is located between the portion of said inner member, received in said tubular member, and the bushing 29.

When the boring head has finalized its working cycle it is desirable to have the inserts 11 removed radially before the return stroke. For that purpose said outer member 45 partially extends beyond the tubular member so as to be engageable with a suitable hand tool. With the embodiment shown the I-slot extends to 90° transversely, so upon turning said outer member 90° the inner member 46 is also rotated 90° thus causing a corresponding amount of rotation to the bushing which ensures radial removal of said inserts 11. At the termination of said rotation the guide pin 54 is caused to engage and follow the axially extending path of the L-slot 53 due to the spring pressure by the coiled spring 55, i.e. pressed to the left in FIG. 9. This causes a safe fixation of the inserts 11 in said inactive position upon removal so that the return stroke of the tool can occur without the danger of unwanted surface damage being caused by the inserts against the bore.

It is to be understood that also an inverted embodiment is practically possible, i.e. an embodiment where the inner member 46 is advanced axially inwards in the tool upon adjusting the position of said bushing 29.

We claim:
1. A boring device comprising:
a boring head,
at least one guide pad arranged on said head to abut and slide along the surface of a bore to be machined,
at least one insert holder mounted on said head for radial adjustment, and
adjustment means for said tool holder comprising:
a shaft,
means mounting said shaft for rotation within said head,
a bushing having a non-circular outer periphery mounted on said shaft for common rotation therewith, there being radial clearance between said bushing and shaft to enable said bushing to shift radially relative to said shaft, and pushing means interposed between said insert holder and said non-circular outer periphery of said bushing in the vicinity of said radial clearance to follow said outer periphery as said shaft rotates, to radially position said insert holder.

2. A boring device as defined in claim 1, wherein said bushing has an oval-shaped outer periphery.

3. A boring device as defined in claim 1, wherein the shaft has an axial extension of square cross-section received in the bore of the bushing, said bore being of non-square rectangular cross-section which is longer in one dimension than the square shaft to define said radial clearance.

4. A boring device as defined in claim 1, wherein the boring head is provided with two diametrically opposed insert holders, said pushing means comprising two steering pins in radially opposite positions of said bushing to perform radial adjustment of said holder.

5. A boring device as defined in claim 1, wherein said shaft is axially movable, and converting means for converting axial movement of said shaft into rotary movement.

6. A boring device as defined in claim 5, wherein said converting means comprises a radial set screw which is stationary relative to said shaft, said screw arranged to engage a helical peripheral slot in the shaft such that said screw follows the path of said slot upon axial movement of the shaft.

7. A boring device as defined in claim 1, wherein the shaft is made in two pieces, an outer member and an inner member, said inner member being axially and rotatably adjustable upon rotary movement of said outer member.

8. A boring device as defined in claim 7, wherein the outer shaft member is provided with an axial recess leaving a peripheral surface of semi-spherical shape, a correspondingly shaped portion of said inner shaft member engaging complementarily in said recess, both said members being supported in the bore of a tubular member threadedly engaged with the boring head.

9. A boring device as defined in claim 7 or 8, wherein said pressing means comprises a plurality of steering members, the outer shaft member is provided with a transversely extending slot for engagement with a first steering member in the boring head, said inner shaft member being provided with an L-slot for engagement with a second steering member in the boring head.

10. A boring device as defined in claim 7, wherein a spring member is arranged axially between the portion of said inner member received in said tubular member, and the bushing, so as to exert axial movement to the inner member after rotation thereof and radial removal of the insert holder.

11. A boring device as defined in claim 1, wherein the insert holder is pivotally supported on an axis extending parallel to the shaft axis.

12. A boring device as defined in claim 1, wherein a spring is disposed in the boring head to urge said insert holder radially inwardly.

13. A boring device as defined in claim 1, wherein the insert holder is provided with second radial adjustment means comprising a radial setting screw engaging a slot in the holder such that unscrewing said screw causes the radially outer insert-holding portion of said holder to move radially outwards.

14. A boring device as defined in claim 1, wherein the insert is tangentially oriented in said insert holder.

* * * * *